US006907135B2

(12) United States Patent
Gifford et al.

(10) Patent No.: US 6,907,135 B2
(45) Date of Patent: *Jun. 14, 2005

(54) SECURITY CHECK PROVISION

(75) Inventors: Maurice M Gifford, Ipswich (GB); Christopher H Seal, Stowmarket (GB); David John McCartney, Ipswich (GB)

(73) Assignee: British Telecommunications public limited company, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,151

(22) PCT Filed: Mar. 2, 1998

(86) PCT No.: PCT/GB98/00638

§ 371 (c)(1),
(2), (4) Date: May 14, 1999

(87) PCT Pub. No.: WO98/39740

PCT Pub. Date: Sep. 11, 1998

(65) Prior Publication Data

US 2001/0014167 A1 Aug. 16, 2001

(30) Foreign Application Priority Data

Mar. 3, 1997 (EP) ............................................. 97301383

(51) Int. Cl.⁷ ................................................. G06K 9/00
(52) U.S. Cl. ........................ 382/117; 382/116; 382/118; 382/124
(58) Field of Search .................................. 382/115, 116, 382/117, 118, 124, 125; 340/825.34; 351/200, 209, 211, 206; 348/77, 78; 380/23; 713/201, 186; 283/72; 356/71

(56) References Cited

U.S. PATENT DOCUMENTS 3,857,018 A    12/1974   Stark et al.
4,975,969 A   * 12/1990   Tai (Continued)

FOREIGN PATENT DOCUMENTS

| EP | 0067611 | 12/1982 |
| FR | 2730076 | 8/1996 |
| GB | 2171828 A | 9/1986 |
| WO | WO 97/02522 | 1/1997 |

OTHER PUBLICATIONS

Smith, "Secure Coprocessing Applications and Research Issues", Los Alamos Unclassified Release LA–UR–96–2805, Aug. 1, 1996, pp. 1–17.

(Continued)

*Primary Examiner*—Vikkram Bali
(74) *Attorney, Agent, or Firm*—Nixon & Vanderhye P.C.

(57) ABSTRACT

Security check method and apparatus reduces problmes that can arise if the user security data set becomes known by unauthorized persons. To address this problem only part of the user data set is recorded in insecure sections of the system. For example, a security check preventing unauthorized remote access to a shared computer is provided by capturing a user data set representing a user's iris, operating the user's personal computer to select only a portion of the captured data set requested by the shared computer and transmitting the portion along a telecommunications line. The shared computer derives partial data sets from stored user data sets using a similar selection to that used by personal computer and compares the partial data set it has derived with the partial data set transmitted by the personal computer in deciding whether to grant access. Point-of-sale devices and cards recording only partial user data sets are also disclosed.

14 Claims, 10 Drawing Sheets

U.S. PATENT DOCUMENTS

| | | | | | |
|---|---|---|---|---|---|
| 4,993,068 | A | * | 2/1991 | Piosenka et al. | 713/186 |
| 5,233,655 | A | * | 8/1993 | Shapiro | 380/23 |
| 5,291,560 | A | * | 3/1994 | Daugman | 382/117 |
| 5,615,277 | A | * | 3/1997 | Hoffman | 382/115 |
| 5,642,160 | A | * | 6/1997 | Bennett | 348/156 |
| 5,815,252 | A | * | 9/1998 | Price-Francis | 356/71 |
| 5,850,470 | A | * | 12/1998 | Kung et al. | 382/157 |
| 5,859,921 | A | * | 1/1999 | Suzuki | 382/118 |
| 5,870,723 | A | * | 2/1999 | Pare et al. | 705/39 |
| 5,901,238 | A | * | 5/1999 | Matsushita | 382/117 |
| 5,984,366 | A | * | 11/1999 | Priddy | 283/72 |
| 6,076,167 | A | * | 6/2000 | Borza | 713/201 |

OTHER PUBLICATIONS

Zviran et al, A Comparison of Password Techniques for Multilevel Authentication Mechanisms, 8199 The Computer Journal, 36 (1993), No. 3, Cambridge, GB, pp. 227–237.

Anderson, "Industrial Cryptography", IEE Review, pp. 118–120, May 1996.

* cited by examiner

SECURITY CHECK PROVISION

BACKGROUND OF THE INVENTION

1. Field of the Invention

The present invention relates to a method of providing an automatic security check. The invention is particularly, but not exclusively, useful in relation to the security of computers accessed via telecommunications links.

2. Related Art

At the most basic level, the provision of a security check involves one person allowing only people whom he recognises to pass. However, this basic system becomes unworkable once such large numbers of people are authorised that it is not feasible for each of them to be recognised by the person providing the security check. For this reason, such checks are often implemented by issuing all those people who are authorised to pass the check with a portable device which indicates that they are so authorised. In order to prevent the portable devices being used by persons other than those that they were issued to, the portable devices may be made specific to that person. For example, the devices may be provided with a photograph of the authorised person or may be signed by the authorised person. An example of the former is a passport which contains a photograph of its owner and an example of the latter is a cheque guarantee card which is signed by its owner. Provided a person judges that there is sufficient similarity between the photograph and the appearance of the person or between the signature of the person and the signature on the card, the possessor of the passport or cheque guarantee card will be allowed to pass the relevant security check, in the examples given, to cross a national border or to debit money from an account.

In many cases, it is desirable to automate the provision of a security check. This is usually achieved by assigning each authorised user a data sequence which is to be memorised by him. For example, a bank account holder may have a personal identification number (PIN) assigned to him and a person who is authorised to access a computer may have a password assigned to him.

More recently, security checks have been developed which involve capture of data which is, at least in part, dependent on a biometric i.e. a statistical or quantitative measure of a biological feature of a person. For example, U.S. Pat. No. 5,291,560 discloses a device which images the eye of a person to obtain data representing the spatial luminance distribution presented by his iris; converts that image data to an "iris code", which is then compared to stored iris codes of authorised users. The capture of other biometrics such as signatures and fingerprints has been suggested.

A problem arises if the data sequence used in an automatic security check falls into the hands of an unauthorised person since he or she can then use the data sequence to breach the security check.

One way in which the security check might be breached is by an eavesdropper who obtains an authorised user's password, PIN or iris code as it is transmitted over a communications link on the user attempting to pass a security check. The password, PIN or iris code can then subsequently be resent by the eavesdropper to allow him to pass a security check. The words "communications link" are here intended to include telephone lines (copper cable or optical fibre), radio or other wireless communication links, any cabling between electronic devices in separate housings and other similar types of links. Such cabling might be monitored using a recording device attached to the communications link or perhaps by monitoring electromagnetic radiation emanating from the link.

A similar problem arises when a portable device having a data sequence stored thereon is carried by authorised users—e.g. a PIN stored on a bankcard—is stolen and read.

A standard approach to these problems is to encrypt the password or PIN using an encryption algorithm. However, many commercial systems rely on encryption techniques that are known to be vulnerable to attack by a competent cryptanalyst. Furthermore, the perceived security of more advanced encryption techniques such as RSA encryption, rests on an underlying assumption that certain mathematical operations are computationally unfeasible to carry out.

It is also known to operate on a data sequence using a so-called one-way hash function. The function operates on the data sequence to provide a shortened data sequence which is sufficient to 'fingerprint' the data sequence. For example, the problem of storing passwords at a central server can be avoided by instead storing the shortened data sequences resulting from operating on the passwords using such a one-way hash function—if the shortened data sequences match, then it is reasonable to assume that a valid password was entered by the user. This allows the provision of password security without necessitating the storage of the passwords themselves at the central server.

Both encryption algorithms and one-way hash functions carry a significant processing overhead, and neither can be shown to guarantee security. The processing overhead is undesirable in commercial systems because it both reduces the rate at which data can be transmitted and increases the cost of equipment.

SUMMARY OF THE INVENTION

According to one aspect of the present invention, there is provided a method of providing an automatic security check, said method comprising the steps of:
operating a user data capture device to:
  (a) obtain, from a user attempting to pass the security check, a user data set; and
  (b) derive a user partial data set, the derivation involving a selection from a user data set;
transmitting said partial data set via a communications link to an authentication apparatus operable to provide one or more acceptable data sets; and
operating said authentication apparatus to compare said user partial data set with said acceptable data set to determine whether said user is a person authorised to pass said security check.

According to a second aspect of the present invention, there is provided a portable device for use in enabling an authorised person to pass a security check, said device comprising storage means storing an acceptable data set comprising elements selected from a user data set associated with said authorised person, without encoding any of the remaining elements in said user data set.

By transmitting data which has based on selected elements from a larger user data set associated with one or more authorised persons, and where the remainder of the user data cannot be derived from the transmitted data, security can be restored after a security breach, by changing the nature of the selection without changing the large user data set itself.

In a similar way, by storing only selected elements from a larger user data set associated with one or more authorised persons on a portable device, security on the system can be restored even if the portable device is stolen, by issuing the authorised user another portable device featuring a different selection of elements from the larger user data set. The apparatus which co-acts with the portable device to provide the security check can then be reconfigured to accept only the new selection from the larger user data set. In that way, security can be restored without there being a necessity to alter the larger user data set itself. This is important in relation to many biometrics since they represent enduring biological characteristics of a person and hence cannot easily be changed.

Furthermore, the selection carried out in the present invention requires less processing than more complex one-way hash functions. The complexity of one-way hash functions makes it difficult to prove that the original data sequence cannot be derived from the shortened data sequence, whereas a simple selection of m elements from a data set having n independent elements (where n>m) clearly prevents an eavesdropper from establishing the original data sequence. Importantly, the user biometric data sets obtained from a given user may vary slightly owing to variation in the biological feature of the user that is being measured or variation in the measurement process itself. Since only slightly different user biometric data sets might lead to significantly different hashes of those sets, comparison with hashes of acceptable biometric data sets is extremely problematic.

Preferably, the method comprises the step of automatically altering the selection process in deriving the user data set in dependence upon the time (e.g. of the transmission). This feature has the result that an eavesdropper re-sending the partial data sequence he has earlier intercepted is less likely to be able to breach the security check. The dependence upon the time of the transmission could be dependence on the time of day, the date, or, the selection could be made according to a pseudo-random sequence which is followed synchronously by the user data capture device and the authentication apparatus.

In some embodiments, the nature of the selection can be indicated to the user data capture device by the transmission of a signal from the authentication apparatus to that device. Such a method may allow a more efficient implementation of an apparatus carrying out the method of the present invention.

If the user data which is being encoded represents a biometric, then security is improved because biometrics by their nature depend at least in part on the biological features of authorised users. As such, they do not need to be memorised. A particular advantage of the user data representing a biometric is that data sets representing biometrics typically have a large number of independent data elements and hence are particularly suitable for use with the method of present invention.

If the biometric chosen is an image biometric for example, e.g. a biometric representing the user's facial appearance or the spatial luminance distribution across his iris, then there is no requirement that the user make physical contact with the user data capture device. This is likely to make the user data capture device easier to use and to allow faster processing of security checks.

A particular advantage of using the luminance pattern of one of the user's irises is that the iris is a more unique identifier than a fingerprint and is almost impossible to alter without unacceptable risk to any would-be impostor.

Additionally to the above, the user partial data set may be encrypted before transmission. As suggested above, the technique of the present invention is more robust than simple encryption since even if the partial user set were to be decrypted, the full user data set would not be available to the person trying to breach the security check.

According to a third aspect of the present invention there is provided: a security check terminal comprising a user partial data acquisition device operable to: (a) obtain, from a user attempting to pass the security check, a user data set; and, (b) derive a user partial data set from the user data set, the derivation involving some, but not all, of the elements from the user data set.

By providing a terminal which only transmits a user partial data set, security is improved since an eavesdropper listening to a signal output by the terminal will not be able to gain knowledge of the full user data set. Hence, the security of a communications network having one or more terminals is improved. Also, the terminal can be provided with a selection capability without significantly increasing its cost or decreasing its speed.

Preferably, the user partial data acquisition device is operable to capture a user data set and is directly connected to one or more processing means operable to select elements from the user data set in deriving a user partial data set.

By providing a direct connection between the acquisition device and the processing means the security of any communication of the user data set is raised. For example, the capture of the user data set and the processing can take place in the same integrated circuit.

In order to provide a terminal which would also be useful as a security check terminal in a situation where a high level of security is not essential, the apparatus might further comprise:

a reader for reading an acceptable data set stored on a portable device, said portable device comprising storage means storing an acceptable data set which is derived from some, but not all, elements of a data set associated with an authorised user;

a comparison means for comparing said user partial data set with said acceptable data set; and an authenticity signal generating means operable to generate a signal indicative of whether the user is an authorised person on the basis of the comparison made by said comparison means.

Such an apparatus might be of use as a point-of-sale apparatus. Then, in order to authorise a transaction involving the transfer of, say, less than fifty pounds, the comparison could be made between the captured user partial data and the acceptable data set stored on the portable device (in conventional systems this is normally a credit card bearing a magnetic strip recording data) without requiring any communication with an authentication apparatus.

However, such terminals will be more accessible to unauthorised persons than will the centrally managed authentication apparatus and therefore the apparatus preferably further comprises an input for inputting a signal from the authentication apparatus indicating how the user partial data set is to be derived from the user data set and an output for outputting the thus derived user partial data set to the authentication apparatus.

According to a fourth aspect of the present invention, there is provided an authentication apparatus comprising:

a partial user data set input means;

an authentication signal output means;

one or more storage media having recorded therein one or more stored data sets, and processor readable code executable to verify that a remote user is an authorised person, said code comprising:

user partial data set input code executable to read a user partial data set via said input means;

acceptable data set acquisition code executable to provide one or more acceptable data sets on the basis of one or more of said stored data sets;

data set comparison code executable to establish whether the user partial data set and the acceptable data set are sufficiently similar to verify that the remote user is an authorised person; and authentication signal generation code executable to cause an authentication signal to be output via said output means on said data sets being sufficiently similar.

According to a fifth aspect of the present invention there is provided a communications network comprising:

one or more authentication apparatuses according to the fourth aspect of the present invention;

one or more security check terminals according to the third aspect of the present invention; and one or more data communications links between said authentication apparatuses and terminals.

BRIEF DESCRIPTION OF THE DRAWINGS

Embodiments of the present invention will now be described, by way of example only, with reference to the following drawings, in which.

DETAILED DESCRIPTION OF EXEMPLARY EMBODIMENTS

Figure 1:
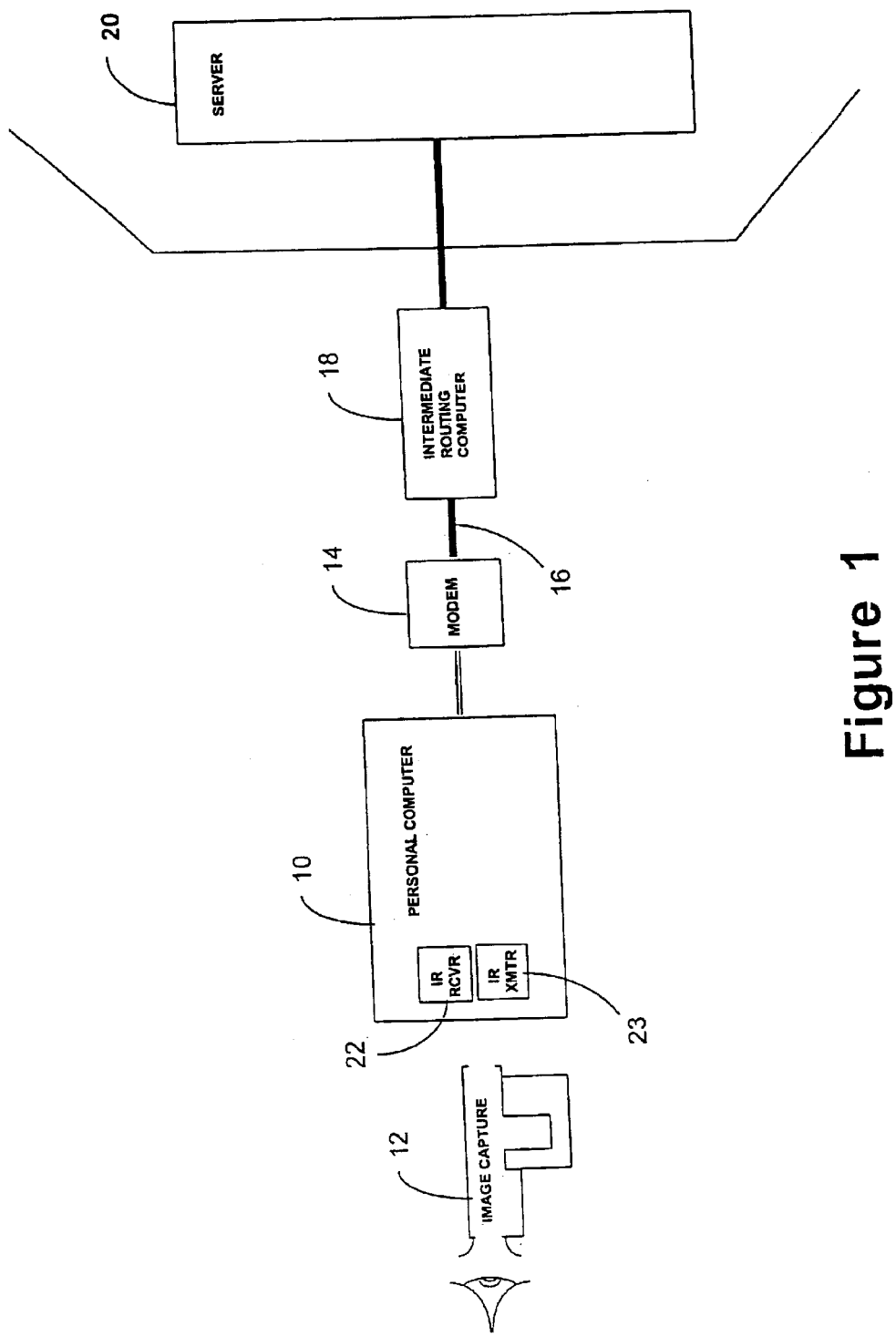
FIG. 1 relates to a first embodiment of the present invention and schematically illustrates a user's computer connected to a company server, via an intermediate routing computer.

FIG. 1 shows a user's personal computer (PC) 10 which, in addition to normal input/output devices and associated interfaces, has an infra-red receiver 22 and transmitter 23 and an infra-red signal interface card (not shown). These additional components enable communication of data between the user's PC 10 and an image capture apparatus 12.

The user's PC 10 is connected via a modem 14 and a telecommunications line 16 to an intermediate routing computer 18, which routes signals from the user's PC 10 to a server 20. The server 20 may, for example, belong to a corporation and have storage means containing files which are of significant value to that corporation. However, where the user of the PC 10 is an employee of that corporation, then the provision of a communications link between the PC 10 and the server 20 has the benefit of allowing that employee to work from home.

Transfer of data between the image capture apparatus 12 and the user's PC 10 involves neither encryption nor the method of the present invention since that link is considered relatively secure in comparison to the telecommunications line 16. Of particular concern is the routing computer 18 which might execute so-called 'sniffer' programs to record passwords or the like as they are transmitted to the server 20.

Figure 2:
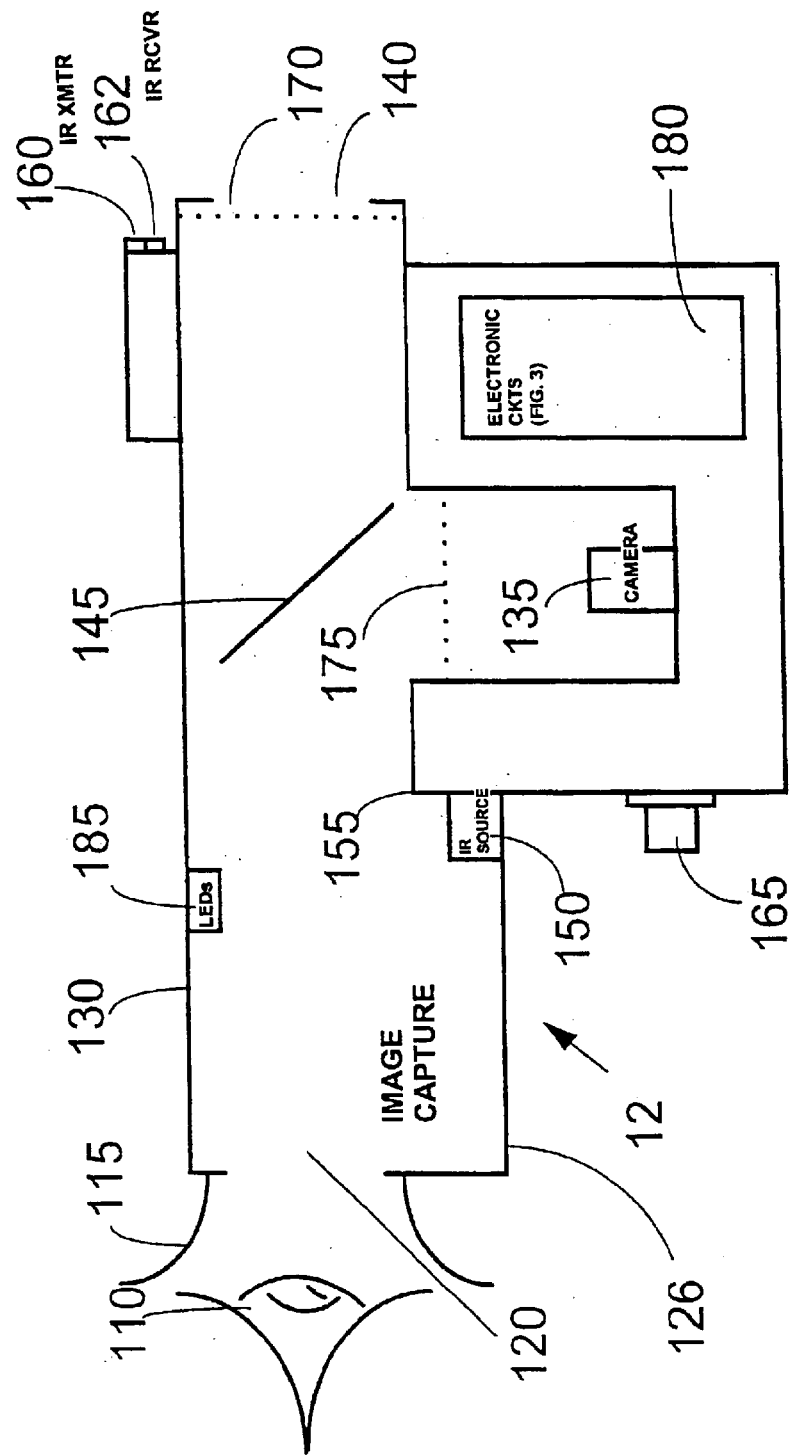
FIG. 2 is a schematic representation of an image capture apparatus for use in relation to the first embodiment.

In more detail, the image capture apparatus (12 and FIG. 2) is contained in a suitable housing 126. A user positions his eye 110 by placing his face appropriately against an eye-cup 115 at a rear window 120 of the housing 126. The eye-cup acts both as a means of minimising the amount of ambient light entering the apparatus and as the means for aligning the user's eye with the window.

The eye-cup 115 is attached to a barrel 130 formed in the housing 126 which provides a fixed separation between the eye 110 and a fixed-focus charge coupled device (CCD) camera 135. The barrel 130 provides a line-of-sight for the user, from the rear window 120 to a front window 140, through the housing 126.

The optical path between the eye 110 and the camera 135 subtends an angle of 90° owing to a partially reflecting mirror 145, angled at 45° to the line-of-sight through the barrel 130.

An infrared (IR) illumination source 150 is located between the mirror 145 and the eye 110 to illuminate the eye. The source has an associated screen 155 to prevent IR light travelling directly from the source 150, via the mirror 145, to the camera 135.

An IR transmitter 160 and receiver 162 are located on the front of the housing 126, in line with the line-of-sight through the barrel 130, and a trigger button 165 is included on the housing for the user to control when the image of his iris is captured.

The front of the barrel 130 includes an IR filter 170 to minimise the amount of stray IR radiation that enters the apparatus. The CCD camera 135 is protected from stray visible light with a visible light filter 175 positioned between the camera and the barrel. The CCD camera is a standard black and white camera which is also sensitive to IR optical radiation.

Figure 3:
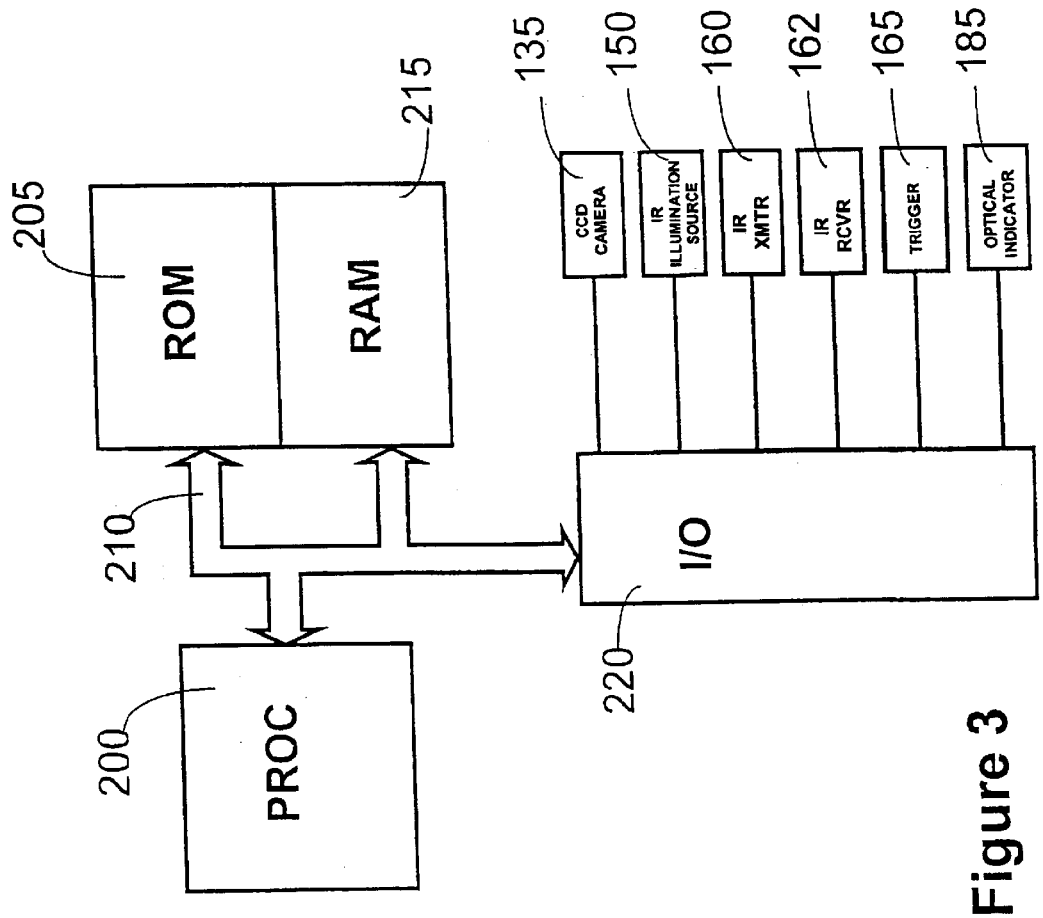
FIG. 3 is a schematic diagram which illustrates one possible hardware architecture for the image capture apparatus.

The apparatus also includes appropriate electronic circuitry 180 contained in the housing (described in more detail in relation to FIG. 3).

An optical indicator 185 positioned in the barrel comprises a red light-emitting diode (LED) and a green LED which are located in the field of view of the user.

The partially reflecting mirror 145 comprises a glass screen with a surface coating which reflects IR and near infrared (NIR) optical radiation and transmits visible light. Screens of this type are sometimes known as heat-reflecting filters or 'hot-mirrors'. An advantage of this type of mirror is that, to some extent at least, the mirror also acts as a filter to IR radiation reaching the eye and to visible light reaching the camera.

The overall size of the apparatus depends mainly on the size of the opening for the eye 120 and on the level of comfort and ease of use required by a user of the apparatus.

The hardware for the apparatus is designed onto a single application specific integrated circuit (ASIC), the size of which is not a limiting factor to the size of the apparatus. Also, known CCD cameras can have dimensions in the order of millimeters and are also not a limiting factor of the apparatus size.

FIG. 3 shows one possible hardware architecture arrangement for the circuitry 180. As already stated, the processing hardware is preferably engineered onto a single ASIC. The apparatus is controlled by a processor 200 which runs software held in read-only memory (ROM) 205. The software in the ROM 205 is executable to operate on image data obtained from the CCD camera 135 using the algorithm described in U.S. Pat. No. 5,291,560, thereby producing a 256-byte iris code. The processor 200 is connected via a bus 210 to the ROM 205, a block of random access memory (RAM) 215 and an input/output (I/O) controller 220. The RAM is large enough to hold at least one captured image of an eye. The I/O controller 220 is connected by appropriate circuitry and drivers (not shown) to the IR transmitter 160 and receiver 162, the CCD camera 135, the trigger 165, the IR illumination source 150 and the optical indicator 185. The whole apparatus is powered by a suitable battery (not shown).

The processor 200 is sensitive to signals received from the trigger 165, the IR receiver 162 and the CCD camera 135. Also, the processor controls the IR transmitter 160, the IR illumination source, the CCD camera operation and the optical indicator 185.

The infrared receiver 22 and transmitter 23 are externally mounted on the user's PC 10 and are connected to the infrared signal interface card (not shown) via a cable connected to one of the PC's output ports. The other devices i.e. the modem 14, transmission line 16, routing computer 18 and server 20 are standard. The user's PC 10 and server 20 store software programs which are executable by the PC and server respectively to carry out the appropriate process steps described below in relation to FIG. 4. Those skilled in the art of programming will be readily able to provide suitable code to carry out those process steps.

Figure 4:
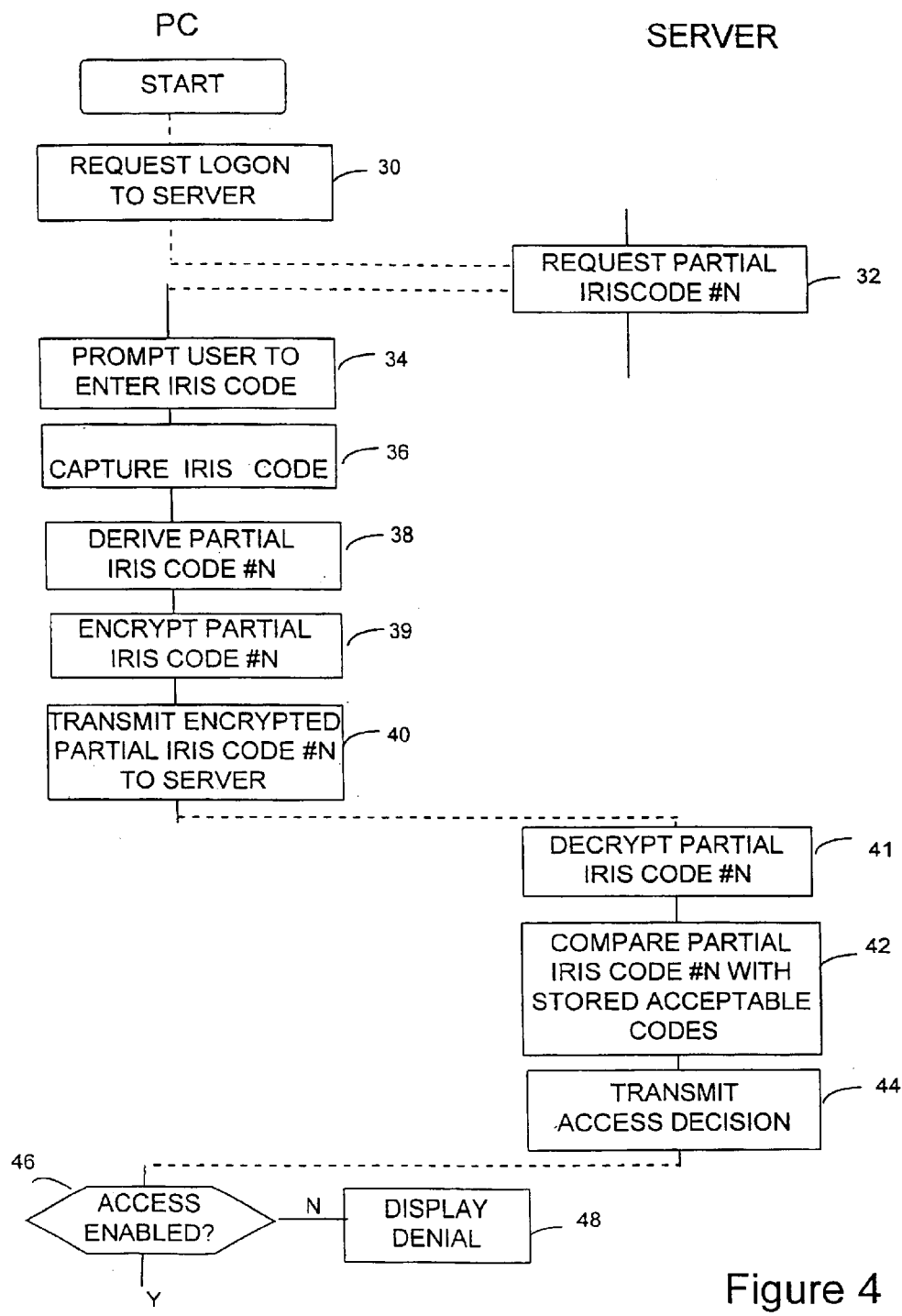
FIG. 4 is a flow chart of a remote login operation carried out on the apparatus of FIG. 1.

Turning now to FIG. 4, on the user making a request to log onto the server via his PC 10, the PC 10 is controlled to output a signal via the modem requesting access to the server 20 (step 30). On receiving that request, the server 20 replies with a request for the PC to transmit a partial iris code to the server 20. The partial iris code required is indicated by the server transmitting a number #N between one and eight with that request (step 32).

In step 34, on the PC receiving the reply from the server 20, a message is displayed on the PC screen prompting the user to operate the image capture apparatus to allow his iris code to be obtained by his PC 10. In step 36 (described in more detail below in relation to FIG. 5), the iris code is transmitted from the image capture apparatus 12 to the PC 10.

A program stored in the RAM of the PC 10 is then executed to derive, from the transmitted iris code, the partial iris code which has been requested by the server 20. That program is effective to select the Nth bit of each byte of the 256-byte iris code to provide a 32-byte partial iris code. For example, if the server requests partial iris code #1 in step 32, then the PC selects the first bit of each byte of the iris code obtained from the user, the order of the bits in the iris code being the same as the order of the bytes in the full iris code from which they are taken. Once this partial iris code has been derived, it is encrypted (step 39) and then transmitted via the modem 14 and routing computer 18 to server 20 (step 40).

On receipt, the encrypted partial iris code is decrypted (step 41) and, in step 42, the server 20 executes a program which is operable to compare the partial iris code received from the PC 10 with stored acceptable codes which have previously been derived from the iris codes of authorised users in a similar way to the derivation of the user partial iris code from the user's iris code i.e. in which derivation the same Nth bit has been selected from each byte of the full iris code. The program outputs an access decision (step 44) which is indicative of whether the transmitted partial iris code is sufficiently similar to one of the similarly generated stored acceptable codes to grant access to the server 20. If the two are not sufficiently similar, a signal representing this decision is sent across the network to the PC 10 to indicate that access to the server is denied. The PC displays a message to this effect (step 48). If the two are sufficiently similar then control of the server 20 by the PC 10 is enabled.

It will be appreciated by those skilled in the art how the present embodiment might be upgraded to request a user name as well as a user partial iris code. This will make the remote login operation faster since the server need only make a comparison with one of the iris codes stored in the database.

Figure 5:
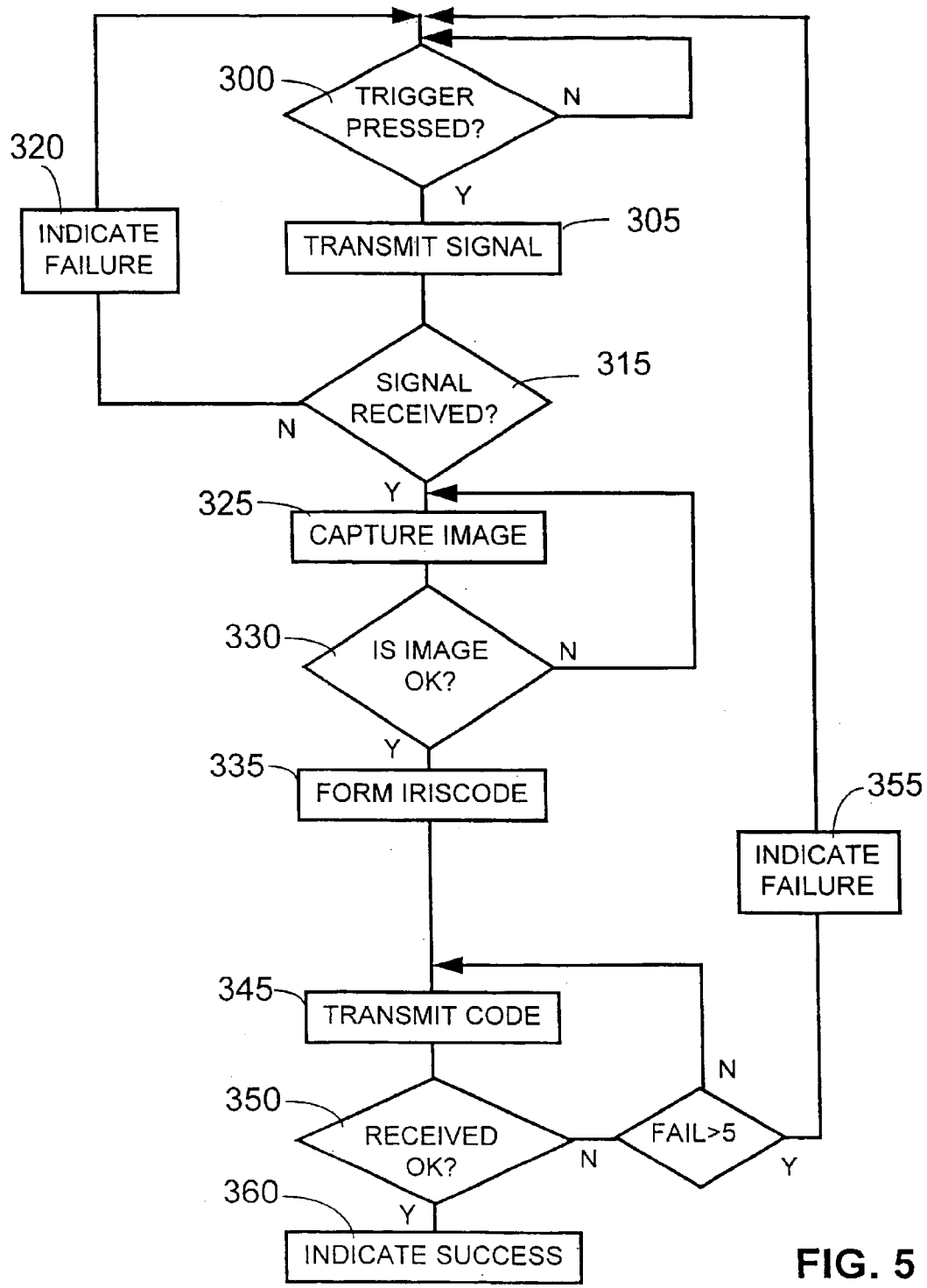
FIG. 5 is a flow chart which illustrates the iris code capture and transmission step of FIG. 4.

The derivation of the selected partial iris code from the captured full iris code in step 38 is now discussed in more detail in relation to FIG. 5.

The flow diagram in FIG. 5 illustrates one possible process for the capture and transmission of full iris codes from the image capture apparatus 12 to the user's PC 10.

In step 300, the imaging apparatus is in a state where the display connected to the PC 10 indicates that the user is to enter his iris code and a trigger depression is awaited to start the process. The user first positions the eye cup 115 against his eye and aligns the image capture apparatus 12 by orienting it such that he can see the receiver 22 externally mounted on the PC 10 by looking through the interior of the housing 126. Then, on the user pressing the trigger 165, the trigger generates a signal which is received by the processor. The processor then controls the IR transmitter to send a signal, in step 305, to the user's PC 10 to initiate communications. In response, the user's PC 10 sends a return message to the imaging apparatus 12.

If the return message is not received by the imaging apparatus 12 in step 315, for example as a result of the user's PC 10 not receiving the first signal, the red LED of the optical indicator 185 is lit (step 320) to indicate failure and inform the user to re-start the process by pressing the trigger again.

When a return message is received by the imaging apparatus 12, in step 325 the processing means signals to the CCD camera 135 that an image should be captured. The image which is captured is stored in the RAM 215. In step 330, the processor 200 determines if the stored image is suitable for encoding. If the image is not suitable, then the processor 200 signals to the camera 135 to capture a further image.

The image capturing step includes control of the illumination source 150. The illumination source 150 is connected in a control loop whereby the processor 200 can vary the light intensity of the source 150 depending on, for example, the colour of the user's iris: a light blue iris reflects far more light and needs less illumination than a dark brown iris. Several sequentially captured images, similar to a video sequence, might be required for the processor 200 and software might be executed by the processor 200 to determine the optimum illumination for the eye before a suitable image is obtained.

Capturing multiple images can also overcome problems such as, for example, the user blinking at the point when one image is captured. Known digital signal processing techniques can be used to establish which image is the best and to reject unsuitable images.

When a suitable image is obtained, the image data is retrieved from the RAM 215 and is processed to form an iris code, in step 335, using the iris code generating algorithm stored in ROM (step 315). The resulting 256-byte iris code is stored in the RAM 215. The iris code is then transmitted to the user's PC 10 by the IR transmitter 160 in step 345.

If the data is received successfully by the user's PC 10, the transmitter 23 transmits a 'success' signal to the image capture apparatus 12 (step 350). The processor 200, in response, causes the green LED of the optical indicator 185 to be lit to indicate to the user that the procedure has been successful in step 360. Repeated failure to transmit the data, for example after five attempts, causes the red LED of the optical indicators to be lit (step 355) and results in the user needing to re-start the whole procedure.

It will be seen how, by only transmitting a selected eighth of the user's iris code, the chances of an eavesdropper being able to log on to the server 20 without authorisation are much reduced.

Figure 6:
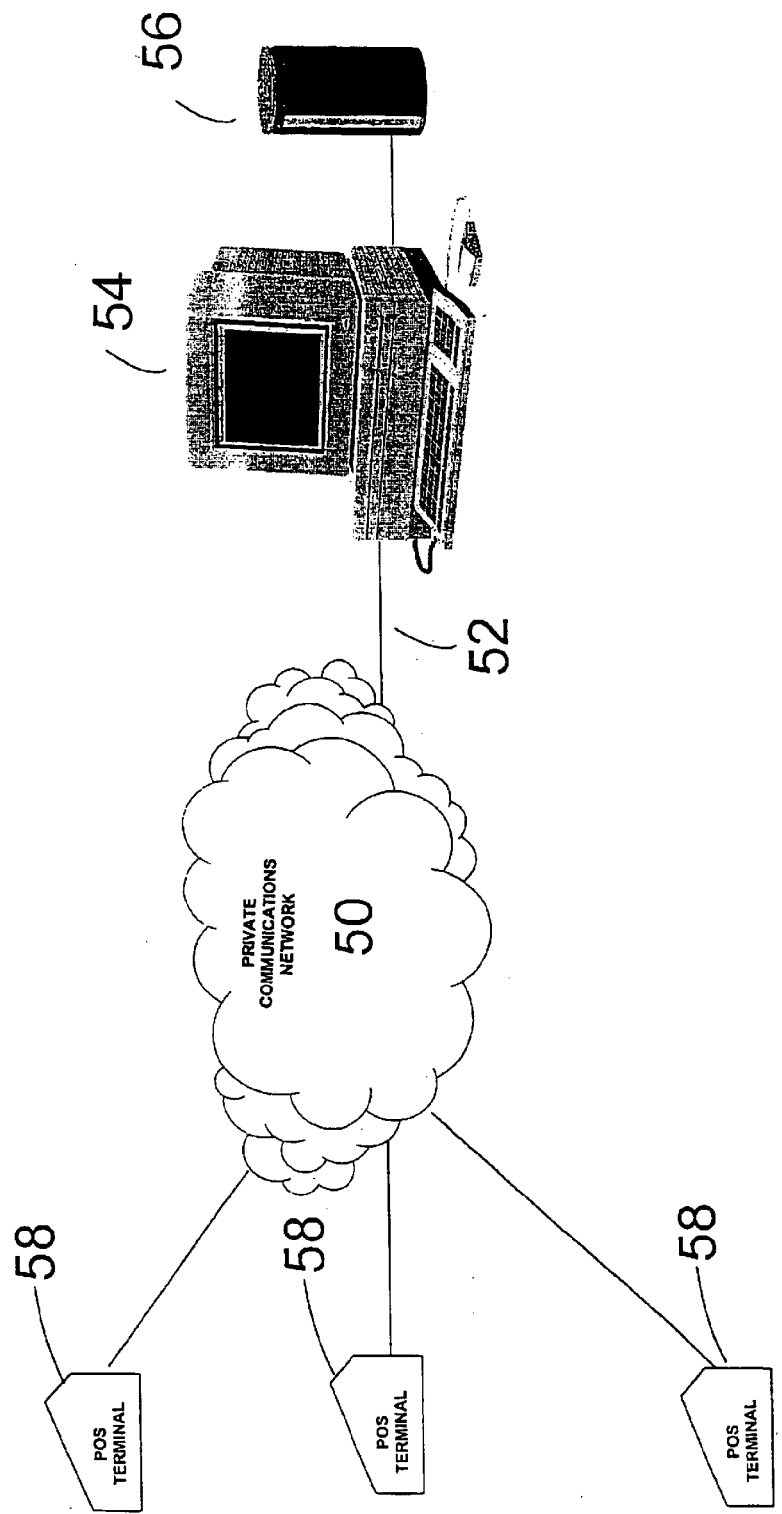
FIG. 6 relates to a second embodiment of the present invention and shows a communication network for use by a financial transaction servicing company.

Another embodiment of the present invention, namely a financial transaction authorisation apparatus, is illustrated in FIG. 6. The apparatus comprises a private communications network 50 constructed in accordance with the X25 standard and connected via an asynchronous transfer mode (ATM) link 52 to a UNIX workstation 54 having a hard disc 56 with a high memory capacity. The hard disc 56 stores the iris codes of all authorised customers of the financial services company, each of whom are initially provided with a plastic card which bears a magnetic strip which records an encrypted partial iris code. This partial iris code initially comprises the first bit of each byte of the stored iris code, the second issue of the card (owing to the card expiring or being stolen) encodes every second bit of the iris code, the third card to be issued encodes every third bit and so on. The magnetic card also encodes the user's account number and the nature of the selection from the full iris code.

The private data network 50 is also connected to a plurality of point-of-sale apparatuses 58 installed at retail outlets. These point-of-sale devices include conventional features such as a liquid crystal display (LCD), a keypad for entering, amongst other things, the value of the transaction, a printer for printing authorisation slips, and a card reader for reading data from the magnetic strip on a user's card. Each terminal 58 also has an output for transferring data to the network 50.

Figure 7:
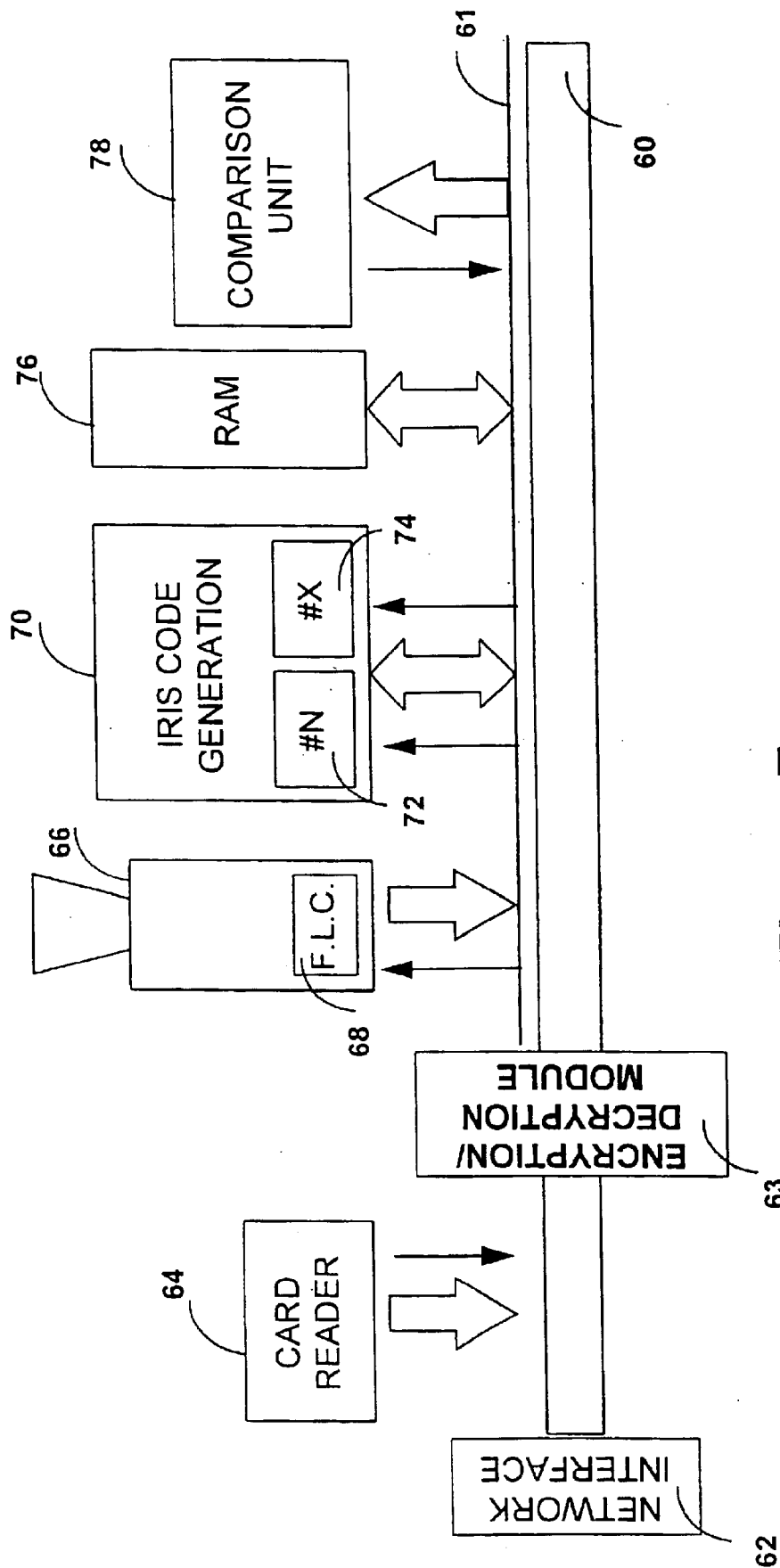
FIG. 7 shows additional elements that would be incorporated into a point-of-sale terminal in the communication network.

The point-of-sale devices 58 of the present embodiment have a number of additional features. FIG. 7 illustrates those additional components and shows how they might be connected via a databus 60 installed in the point-of-sale device 58. Transfer of more than two bytes of data is illustrated using thick arrows, whereas transfer of less than two bytes of data is illustrated using thin arrows. The databus 60 is connected via an encryption/decryption module 63 to a network interface 62 which enables the transfer of signals to and from the X25 network 50.

As mentioned above, the magnetic strips on the cards issued to the authorised users of the apparatus have an encrypted 32-byte partial iris code and the corresponding account numbers stored thereon. The point-of-sale device comprises a card reader 64 which is operable to read the data on the card and place it on the databus where it can be decrypted by the encryption/decryption module 63. The additional components also comprise a charge coupled device (CCD) camera 66 having an auto-focus mechanism which is operable to capture, in digital form, an image of the user and pass it onto the databus 60. If desired, the auto-focus mechanism can be overridden by sending a signal to the focal length control unit 68 included within the camera 66. The focal length control signal can be transmitted via the databus 60. An application specific integrated circuit (ASIC) 70 contains hardware which is operable to input the digital image captured by the camera 66, to identify the user's right iris in that image, and thereafter generate a 256-byte iris code (again using a similar method to that disclosed in U.S. Pat. No. 5,291,560) and input the resulting iris code to one of two partial iris code derivation modules 72,74. A first one of these modules 72 is operable to input a three bit binary value from the databus 60 and to output a 32-byte partial iris code, derived in a similar way to the partial iris code derived in relation to the first embodiment, featuring the bits selected in accordance with the three bit value onto the databus 60. The second module 74 is operable to input a thirteen bit value from the databus 60 and to output a 160-byte partial iris code onto the databus 60. The device 58 further comprises a RAM unit 76 for storing digital image data, partial iris codes, acceptable codes transmitted over the network and obtained using the card reader 64. Finally, the apparatus has a comparison unit 78 which is operable to input acceptable data sets from the card reader 64 transmitted via the databus 60 and partial iris codes transmitted via the databus 60 from the ASIC 70.

Figure 8:
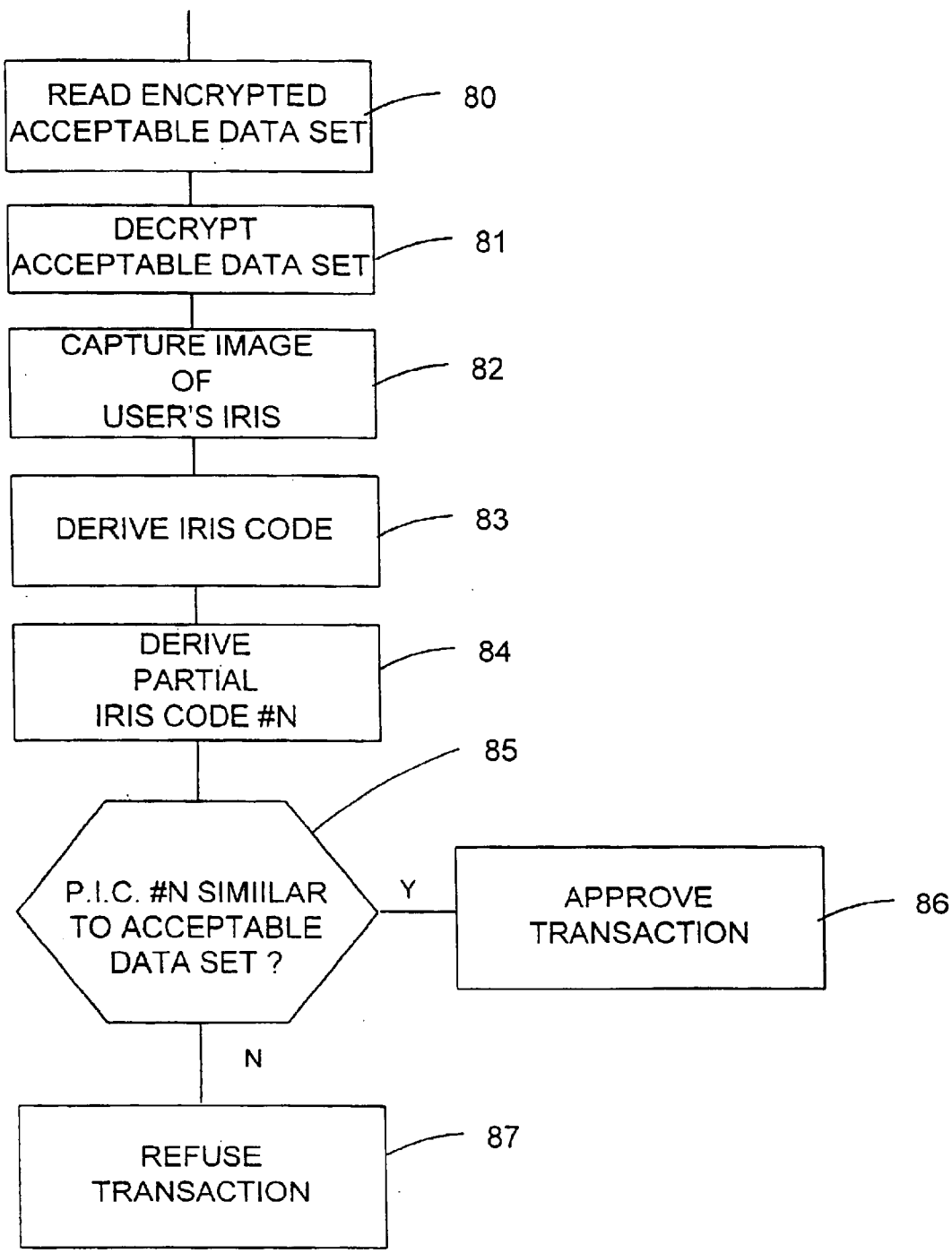
FIG. 8 is a flowchart showing the operation of the elements of the second embodiment of the present invention when used in relation to a low value financial transaction.

In carrying out a low value financial transaction (FIG. 8), the user hands the shop assistant his card which is then swiped through the reader of the terminal device 58. The reader 64 outputs the encrypted acceptable data set stored on the card onto the databus 60 (step 80). The data is then decrypted by the decryption module 63 (step 81) and stored in the RAM 76. Thereafter, the shop assistant keys in the value of the transaction, which again is stored in the RAM 76. Thereafter, the apparatus communicates with the server 54 via the network 50 in order to establish whether the user has sufficient credit to finance the transaction. (The steps involved are similar to those carried out in conventional apparatuses and are not illustrated). Provided the user has sufficient credit, the camera 66 is controlled to capture an image of the user's iris (step 82). The digital data representing that image is then loaded onto the databus 60 and into the ASIC 70. The ASIC 70 generates a 256-byte iris code and passes it to the module 72 which derives the partial iris code indicated by the issue number of the card, that number being fetched from the RAM 76 (step 84).

The partial iris code generated in this way is then output onto the databus and into the comparison unit 78 where it is compared to the acceptable data set obtained from the card reader 64 installed in the RAM 76 (step 85). If the partial iris code is sufficiently similar to the acceptable data set then the low value transaction is approved, and the shop assistant may complete the transaction. If the two data sets are not sufficiently similar, the transaction is refused (step 87).

In the above description, it will be realised that the iris code checking procedure replaces the current technique of user authentication, i.e. signature comparison. However, the security of the transaction can be improved further if the steps of FIG. 9 are carried out instead of the steps of FIG. 8.

Figure 9:
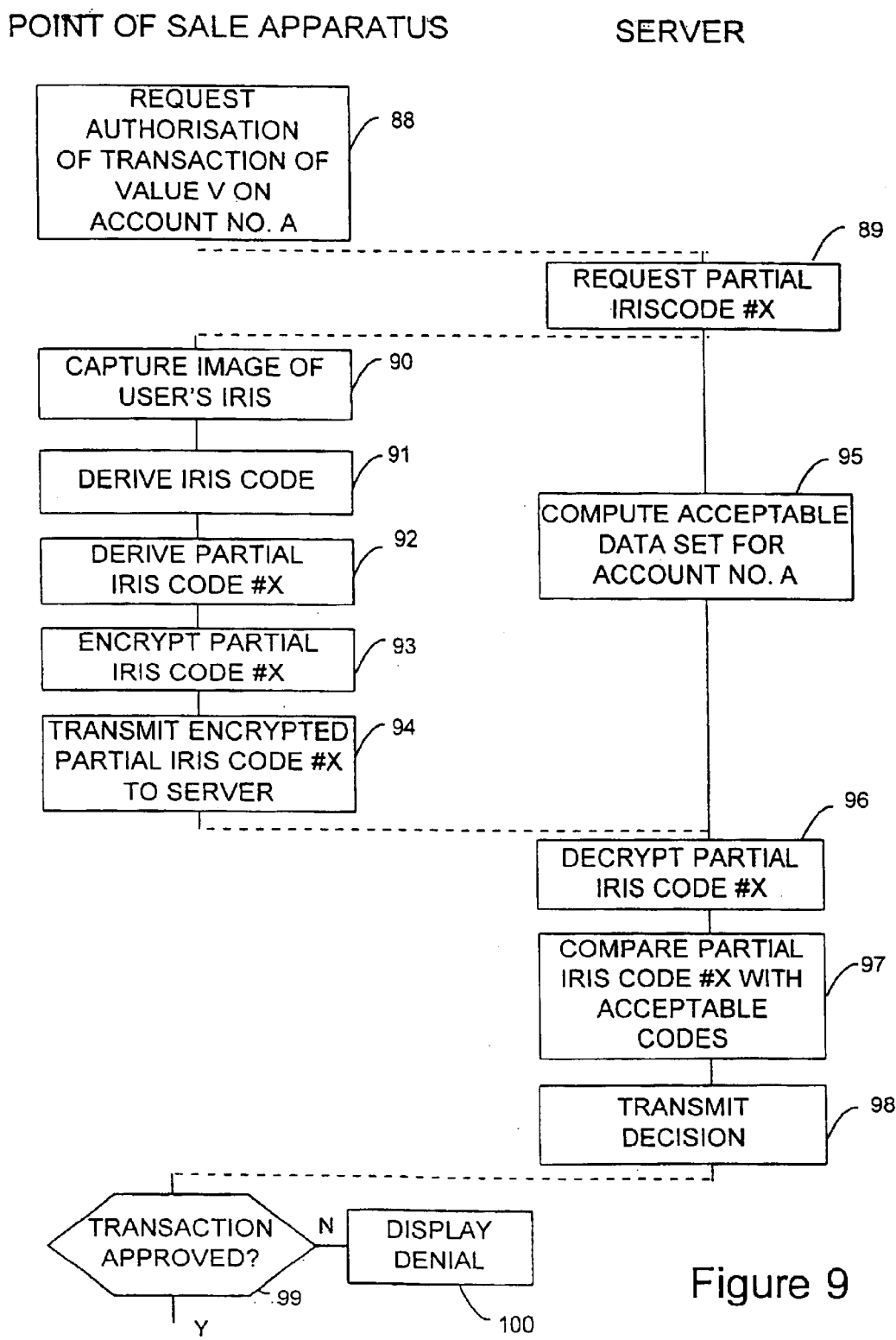
FIG. 9 is a flowchart showing the operation of the elements of the network when used in relation to a financial transaction of higher value.

In the method illustrated in FIG. 9, the partial iris code (in this case designated #X), is derived by selecting five out of each of the eight bits of each byte of the 256-byte iris code.

It will be realised that the selection can be made in 56 different ways, and the five bits selected can then be ordered in 120 different ways giving 6720 possible ways of deriving a partial iris code. Hence, the value which specifies the selection is a thirteen-bit binary value which represents a number between 1 and 6720 selected pseudo-randomly by the server 54. This thirteen-bit value is transmitted across the network by the server in step 87, and on arrival at the point-of-sale device is stored in the RAM 76.

To initiate the transaction process, the shop assistant swipes the user's card through the card reader 64 which gathers data relating to the user's account number from the magnetic strip on the card. The account number is then stored in the RAM 76. Thereafter, the shop assistant keys in the value of the transaction using the keypad. Both of these items of information are sent (step 88) in a known manner to the server 54 which responds by either sending a signal indicating that insufficient credit is available for the transaction or alternatively transmits a thirteen-bit signal indicating the way in which a partial iris code #X is to be derived (step 89). On receipt at the point-of-sale device, the thirteen-bit binary value is stored in the RAM 76 and the camera 66 is controlled to capture an image of the user's iris (step 90). The data representing the digital image is then transferred to the iris code generation ASIC 70 where the input digital data is processed to provide a 256-byte iris code (step 91). That iris code is then input to the partial iris code module 74 which also receives the thirteen-bit value from the RAM 76. The iris code is operated on by the module in accordance with the thirteen-bit value to provide the requested iris code (step 92). Those skilled in the art will be able to design the hardware within the ASIC so as to cause it to carry out the necessary operation. The requested partial iris code is then sent via the databus 60 to the encryption/decryption module 63 where it is encrypted (step 93) and thereafter transmitted through the network interface 62 and back to the server 54 (step 94).

In the meantime, software in the server 54 is executed to cause the computer to compute an acceptable data set for the account holder by taking the enrolled 256-byte iris code stored as part of the database recorded on the hard disk (FIG. 6, 56) for that user and carrying out similar operations (step 95) on the enrolled iris code to those carried out at the point-of-sale device 58 on the captured iris code. It will be realised by those skilled in the art that this operation could instead be carried out using hardware similar to the module 74 contained within the ASIC 70 in the point-of-sale device.

The server 54 then decrypts the encrypted partial iris code transmitted from the point-of-sale device (step 96) and carries out a comparison of the transmitted partial iris code with the acceptable code it has just computed (step 97). The server 54 transmits a signal which indicates the result of that comparison (step 98). If the two codes are sufficiently similar then the server outputs a signal representing an approval of the transaction which is received by the point-of-sale device (step 99), the transaction being allowed to continue. If, however, the computer transmits a signal representing disapproval of the transaction, then the point-of-sale device 58 displays a refusal of the transaction in step 100.

In the above procedure, the thirteen-bit value is derived pseudo-randomly by the server 54. However, alternative arrangements can be envisaged in which the value is dependent on the time of the request. For example, the point-of-sale apparatus 58 might additionally forward to the server in step 88 an indication of the time and date of the request. Both the server and the point-of-sale device might synchronously follow a sequence of numbers between 1 and 6720, each deriving a partial iris code in accordance with the number valid at the time of the request. This sequence might simply involve the number being incremented by 1 every five minutes or might be a pseudo-random sequence synchronously followed by both the server 54 and the point-of-sale device 58. Many other possibilities will occur to those skilled in the art.

The procedure illustrated in FIG. 9 may be modified by omitting the comparison carried out by the server 54 (steps 96–98) and instead transmitting the acceptable code derived by the server to the point-of-sale device 58, the comparison then being carried out by the comparison unit 78.

Figure 10:
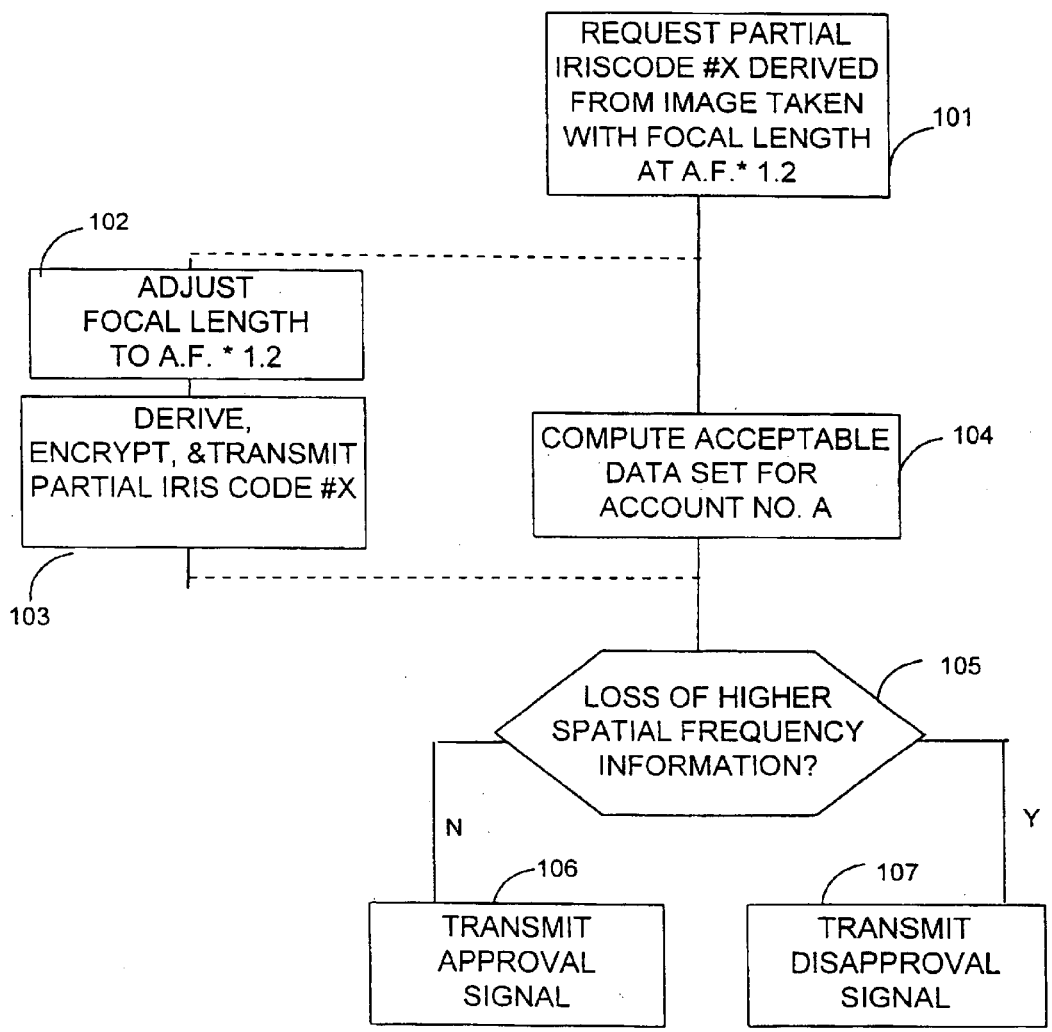
FIG. 10 is a flowchart showing a further sequence of operations which may be additionally followed to increase the certainty of the authentication of the user.

To add a yet further increased degree of security to the transaction, the additional steps shown in FIG. 10 may be carried out. These steps might, for example, be carried out in place of step 86 shown in FIG. 8 or after the transaction being approved in step 99 of FIG. 9.

Having established, using the methods described above with reference to FIGS. 8 and 9, to a first level of certainty that the user is authentic, security can be improved further by arranging the server to transmit a request that the point-of-sale device provides a partial iris code #X which is derived from an image where the focal length of the optics on the camera 66 is set by the focal length control unit 68 rather than being automatically set in this case, in step 101, the server 54 sends a signal across the network to the point-of-sale device 58 which includes a signal indicative of desired focal length together with the signal indicative of which of the partial iris codes is required. In the present example, the signal indicates that the focal length is to be increased to 1.2 times the value calculated by the auto-focus mechanism.

These values are input by the point-of-sale apparatus 58, the partial iris code number being stored in the RAM 76 and the focal length code being transmitted to the focal length control unit 68. The focal length control unit is then operable to adjust the optics of the camera to have the new focal length (step 102), whereafter an image of the user's iris is obtained. The particular partial iris code is then derived, encrypted and transmitted (step 103) as explained above in relation to Steps 82 to 84 of FIG. 8. In the meantime, the server 54 computes (step 104) an acceptable data set as explained above in relation to step 95 of FIG. 9.

The server then runs an algorithm (step 105) to compare the derived partial iris codes and establishes whether the transmitted partial iris code contains less higher spatial frequency information than the acceptable data set. If it does, then that can be taken as an indication of the end-to-end security of the network and a signal representing approval of the transaction is output in step 107. Alternatively, if the expected loss of higher spatial frequency information is not seen, then a signal representing disapproval of the transaction is output in step 106.

What is claimed is:

1. An authentication apparatus comprising:
a user partial biometric data set input means;
an authentication signal output means;
one or more storage media having recorded therein one or more authorised person entire biometric data sets, and processor readable code executable to verify that a remote user is an authorised person, said code comprising:
user partial biometric data set input code executable to read a user partial biometric data set via said input means;

authorised person partial biometric data set acquisition code executable to obtain one or more authorised person partial biometric data sets on the basis of one or more of said authorised person entire biometric data sets, said obtaining of said one or more authorised person partial biometric data sets involving a predetermined selection of elements from the user entire biometric data set, said selection of elements being performed so as to select different elements, between obtainings, of authorised person partial biometric data sets from an authorised person entire biometric data set;

data set comparison code executable to establish whether the user partial biometric data set and the authorised person partial biometric data set are sufficiently similar to verify that the remote user is an authorised person; and authentication signal generation code operable to cause an authentication signal to be output via said output means on said data sets being sufficiently similar.

2. A communications network comprising:

one or more authentication apparatuses according to claim 1;

one or more security check terminals comprising:

a user partial biometric data set acquisition device operable to:
  (a) obtain, from a user attempting to pass the security check, a user entire biometric data set; and
  (b) obtain a user partial biometric data set from the user entire biometric data set without obtaining additional biometric data from the user, the obtaining of said user partial biometric data set involving the selection of elements from the user entire biometric data set, wherein said selection of elements is performed so as to select different elements from the user entire biometric data set each time a user attempts to pass the security check; and one or more data communications links between said authentication apparatuses and terminals.

3. A method of providing an automatic security check, said method comprising the steps of:
  (a) operating a user data capture device to obtain, from a user attempting to pass the security check, a user entire biometric data set representing an entire biometric of the user;
  (b) obtain a user partial biometric data set from the user entire biometric data set without obtaining additional biometric data from the user, the obtaining including a predetermined selection of elements from the user entire biometric data set, wherein said selection of elements is performed so as to select different elements from the user entire biometric data set each time a user attempts to pass the security check;
  (c) transmitting said user partial biometric data set via a communications link to an authentication apparatus operable to provide one or more authorised person partial biometric data sets;
  (d) operating said authentication apparatus to compare said user partial biometric data set with at least one authorised person partial biometric data set obtained from a corresponding authorised person entire biometric data set using a selection process similar to that used in obtaining the user partial biometric data set from the user entire biometric data set; and
  (e) determining that said user is a person authorised to pass said security check on said user partial biometric data set and authorised person partial biometric data set being sufficiently similar to verify that the user is an authorised person.

4. A method as in claim 3 further comprising the step of automatically altering the selection process to be used in obtaining said user partial biometric data set in dependence upon time.

5. A method as in claim 3 further comprising the step of operating said authentication apparatus to transmit a challenge signal to said capture device specifying which elements are to be selected from the user entire biometric data set to obtain the user partial biometric data set.

6. A method as in claim 3 wherein said authentication apparatus stores one or more authorised person entire biometric data sets and said provision of authorised person partial biometric data sets involves selecting elements from corresponding authorised person entire biometric data sets using a selection process similar to that used in obtaining the user partial biometric data set from the user entire biometric data set.

7. A method as in claim 6 wherein said user entire biometric data set represents an image biometric and said biometric capture device comprises an imaging device.

8. A method as in claim 7 wherein said imaging device has externally controllable optical parameters and said method further comprises the step of operating said authentication apparatus to transmit a challenge signal to said imaging device effective to specify one or more of said externally controllable optical parameters.

9. A method as in claim 8 wherein said externally controllable optical parameters comprise the focal length of the imaging device and the challenge signal is effective to specify the focal length.

10. A method as in claim 6 wherein said user entire biometric data set represents a luminance pattern of the one of the user's irises.

11. A method as in claim 3 further comprising the step of encrypting said user partial biometric data set before transmission.

12. A method as in claim 3 wherein said user entire biometric data set relates to only one type of biometric.

13. A method for more securely using biometric data in performing an automated security check via a communications link, said method comprising:

capturing a complete first biometric data set from a proposed user at a security check point;

selecting a predetermined subset of independent elements of said first biometric data set to create a partial second biometric data set from which it is impossible to infer said complete first biometric data set without obtaining additional biometric data from the user;

transmitting said second biometric data set over a communications link to an authentication processor where it is compared in a security check to a similar first subset of at least one of previously stored complete biometric data sets for authorised users; and returning the result of said security check comparison back to the security check point;

wherein said selecting step is performed so as to select a different subset of independent elements of said first biometric data set each time a proposed user attempts to pass the security check point.

14. A method as in claim 13, wherein the communications link is an insecure communications link.

* * * * *